United States Patent
Lee et al.

(10) Patent No.: US 8,955,147 B2
(45) Date of Patent: Feb. 10, 2015

(54) MOBILE DEVICE PRIVACY APPLICATION

(71) Applicants: Verizon New Jersey Inc., Newark, NJ (US); Verizon Patent and Licensing, Inc., Basking Ridge, NJ (US)

(72) Inventors: Woo Beum Lee, Basking Ridge, NJ (US); Michelle Felt, Randolph, NJ (US); Jeffrey M. Walsh, Verona, NJ (US)

(73) Assignees: Verizon Patent and Licensing Inc., Basking Ridge, NJ (US); Verizon New Jersey Inc., Newark, NJ (US)

( * ) Notice: Subject to any disclaimer, the term of this patent is extended or adjusted under 35 U.S.C. 154(b) by 20 days.

(21) Appl. No.: 13/705,782

(22) Filed: Dec. 5, 2012

(65) Prior Publication Data

US 2014/0157424 A1   Jun. 5, 2014

(51) Int. Cl.
*G06F 21/00*   (2013.01)
*G06F 21/74*   (2013.01)
*G06F 21/60*   (2013.01)

(52) U.S. Cl.
CPC ............... *G06F 21/74* (2013.01); *G06F 21/60* (2013.01); *G06F 21/604* (2013.01); *G06F 2221/032* (2013.01)
USPC ................... 726/27; 726/28; 726/29; 726/30

(58) Field of Classification Search
CPC ...................................................... H04M 1/68
See application file for complete search history.

(56) References Cited

U.S. PATENT DOCUMENTS

| | | | |
|---|---|---|---|
| 6,529,209 B1* | 3/2003 | Dunn et al. | 345/629 |
| 2008/0242265 A1* | 10/2008 | Cohen et al. | 455/411 |
| 2012/0131471 A1* | 5/2012 | Terlouw et al. | 715/741 |
| 2013/0021240 A1* | 1/2013 | Coulon | 345/156 |

OTHER PUBLICATIONS

IP.com—Method and System for Controlling the Backlight of a Display Device through Software; Authors: Disclosed Anonymously; Date: Jul. 7, 2010; Publisher: IP.com IP.com No. IPCOM000197403D; pp. 2.*

IP.com—System and Method to Enhance Screen Privacy while Maintaining Cognitive Flow using a Computing Device; Authors: Disclosed Anonymously; Date: Jan. 10, 2012; Publisher: IP.com IP.com No. IPCOM000214098D; pp. 3.*

* cited by examiner

*Primary Examiner* — Harunur Rashid
*Assistant Examiner* — Andrew Steinle

(57) ABSTRACT

A device is configured to determine that the device is to activate a privacy mode, obscure information displayed by a display of the device, detect a user interaction with a first portion of the display, the first portion being less than an entirety of the display, and reveal first information obscured by the first portion of the display, without revealing information obscured by a remaining portion of the display, the first portion and the remaining portion comprising the entirety of the display.

20 Claims, 10 Drawing Sheets

US 8,955,147 B2

MOBILE DEVICE PRIVACY APPLICATION

BACKGROUND

Mobile devices, such as smart phones, are often used in public places, where information displayed on the screens of the mobile devices may be viewed by people other than the users of the mobile devices. Some mobile devices have large display screens, making the information displayed on the screens easy for people other than the users to view.

DETAILED DESCRIPTION OF PREFERRED EMBODIMENTS

The following detailed description of example implementations refers to the accompanying drawings. The same reference numbers in different drawings may identify the same or similar elements.

A user of a user device, such as a smart phone, may use the user device in a public place, where information displayed on a display screen of the user device may be viewed by people other than the user. The user device may display private information that the user wants to see, but that the user does not want other people to see. Implementations described herein may assist a user in viewing private information on a user device, while preventing people in the user's vicinity from viewing the private information.

Figure 1:
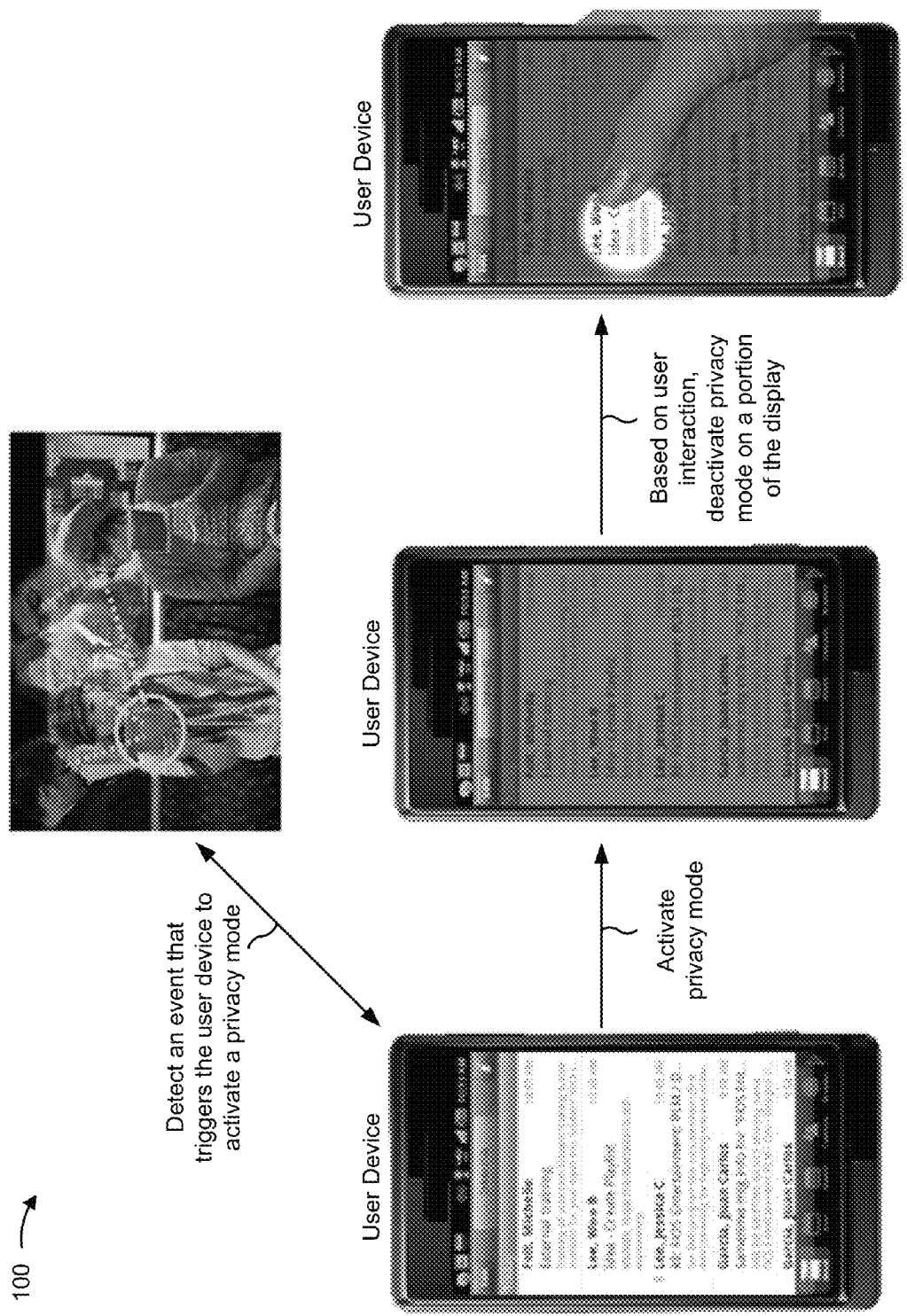
FIG. 1 is a diagram of an overview of an example implementation described herein.

FIG. 1 is a diagram of an overview of an example implementation 100 described herein. As shown in FIG. 1, example implementation 100 may include a user device, such as a smart phone. The user device may present information on a display, such as a touch screen.

As shown in FIG. 1, the user device may detect an event that triggers the user device to activate a privacy mode. For example, the user device may detect that multiple people are in the vicinity of the user device. The user device may use a camera to detect multiple faces, may use a microphone to detect the sound of multiple voices, etc. Based on detecting that multiple people are in the vicinity of the user device (or some other event), the user device may activate the privacy mode on the user device. The privacy mode may obscure information displayed on the user device. For example, the user device may darken the display of the user device, as shown.

As further shown in FIG. 1, a user may interact with a portion of the display of the user device, such as by touching a portion of the display (e.g. on a touch screen display). The user device may detect the user interaction, and may deactivate the privacy mode on the portion of the display where the user interaction is detected. The user device may deactivate the privacy mode by revealing information obscured by the portion of the display. For example, the user device may lighten a portion of the darkened display corresponding to the portion of the display where the user interaction is detected (e.g., the portion that the user has touched or is touching). For example, the user device may lighten a portion of the display surrounding the portion of the display that the user is touching, as shown.

Figure 2:
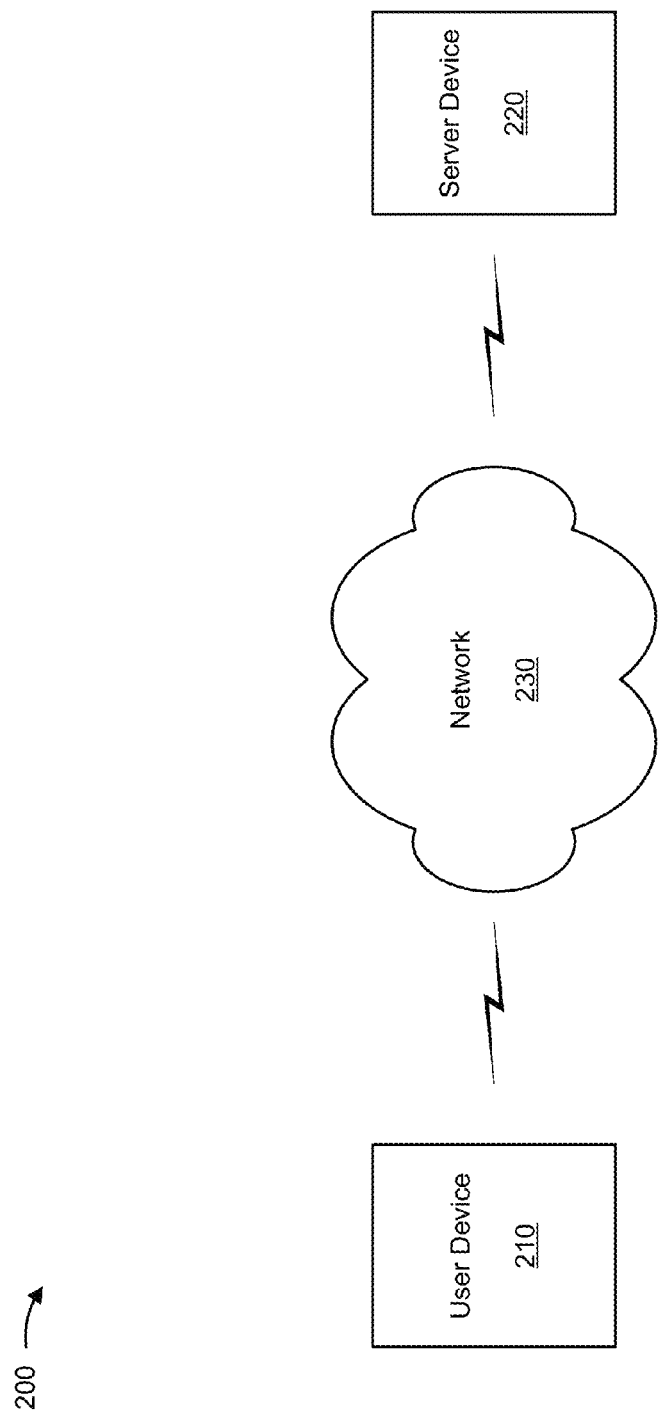
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, and a network 230.

User device 210 may include a device capable of providing, presenting, and/or displaying information. For example, user device 210 may include a mobile phone (e.g., a smart phone, a radiotelephone, etc.), a computing device (e.g., a desktop computer, a laptop computer, a tablet computer, a handheld computer, etc.), or a similar device. In some implementations, user device 210 may include a touch screen display that allows a user to provide input to user device 210. Additionally, or alternatively, user device 210 may include a communication interface that allows user device 210 to receive information from and/or transmit information to server device 220. In some implementations, user device 210 may include a camera, a microphone, and/or other components that permit user device 210 to receive input and/or detect conditions in the vicinity of user device 210.

Server device 220 may include one or more server devices. In some implementations, server device 220 may provide a privacy mode application and/or information associated with a privacy mode application (e.g., conditions that cause user device 210 to activate a privacy mode of user device 210, conditions that cause user device 210 to deactivate a privacy mode of user device 210, user preferences associated with the privacy mode, etc.) to user device 210.

Network 230 may include one or more wired and/or wireless networks. For example, network 230 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
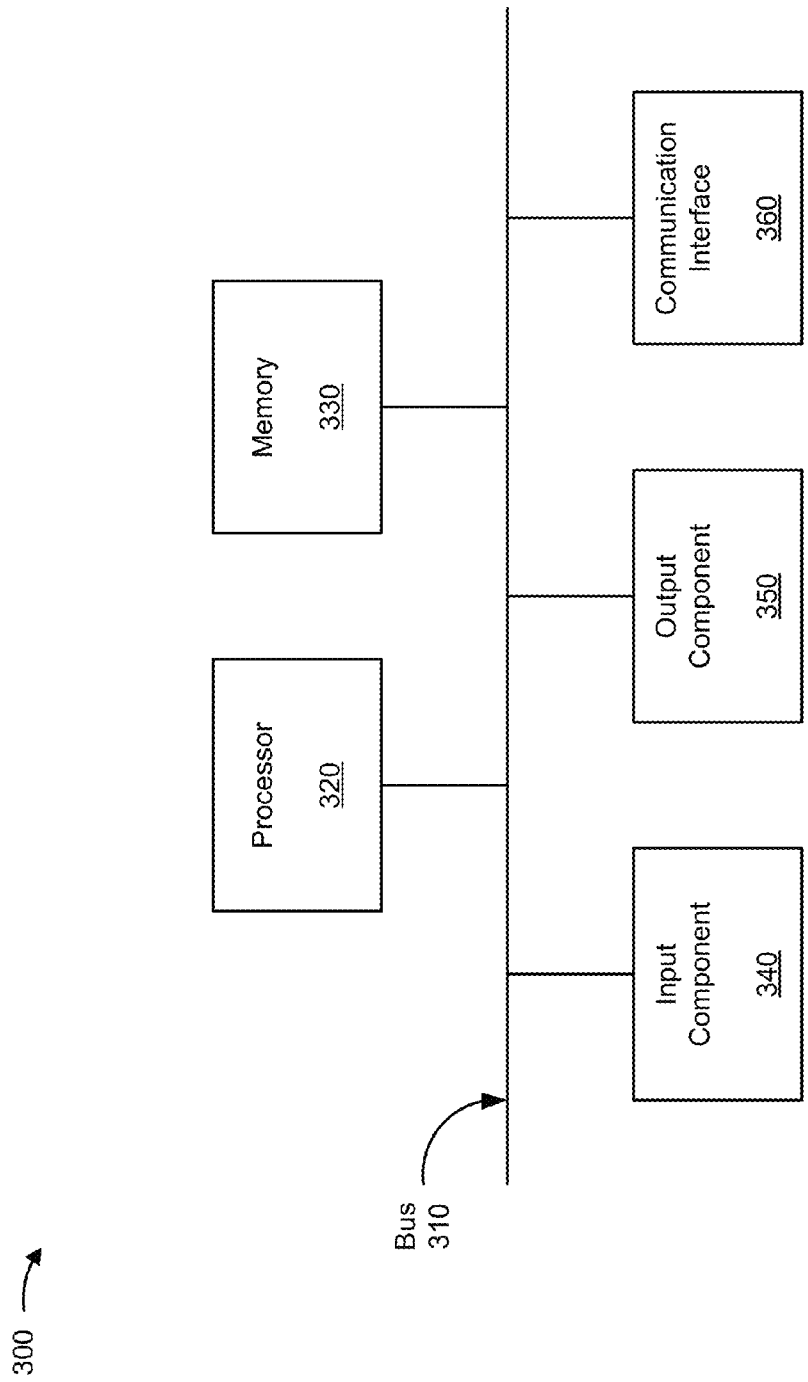
FIG. 3 is a diagram of example components of one or more devices of FIG. 2.

FIG. 3 is a diagram of example components of a device 300. Device 300 may correspond to user device 210 and/or server device 220. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of user device 210 and/or server device 220 may include one or more devices 300 and/or one or more components of device 300.

Figure 4:
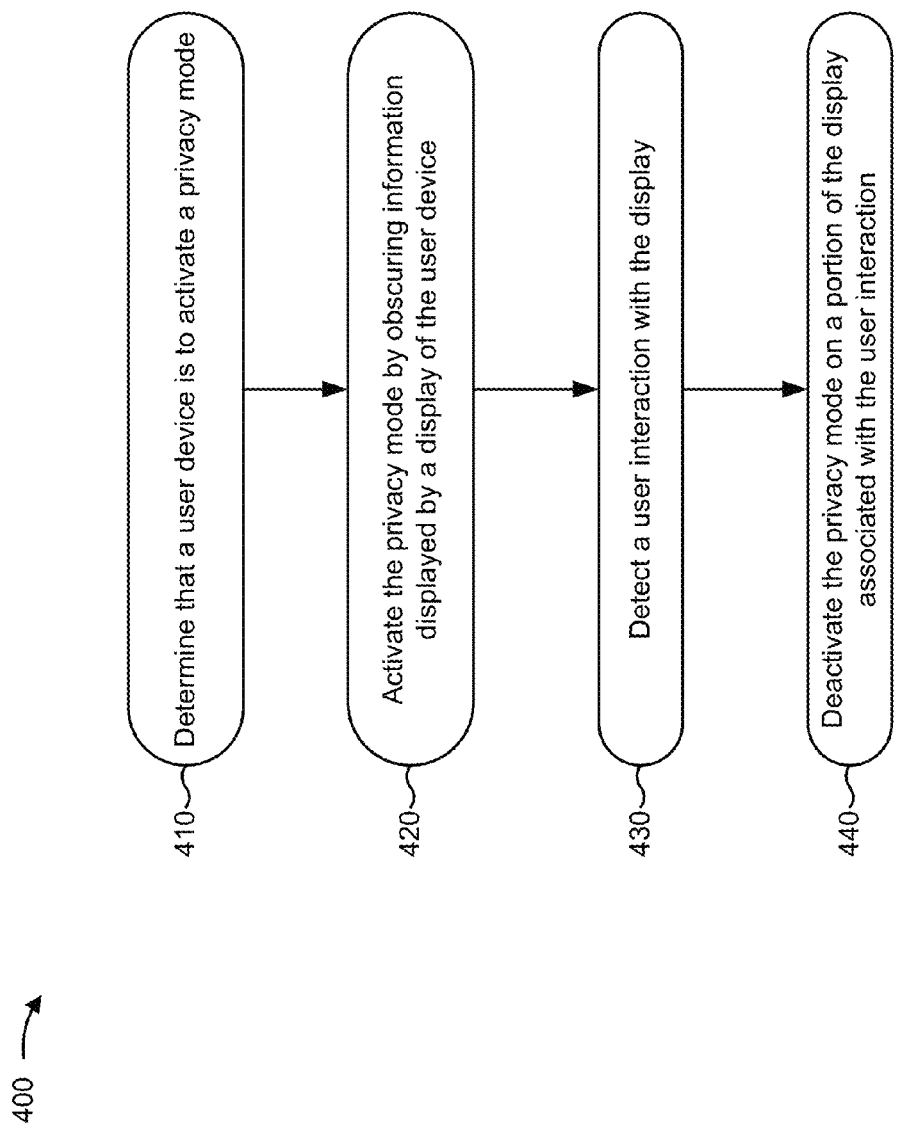
FIG. 4 is a flow chart of an example process for using a privacy mode of a user device.

FIG. 4 is a flow chart of an example process 400 for using a privacy mode of a user device. In some implementations, one or more process blocks of FIG. 4 may be performed by user device 210. Additionally, or alternatively, one or more process blocks of FIG. 4 may be performed by another device or a group of devices separate from or including user device 210, such as server device 220.

As shown in FIG. 4, process 400 may include determining that a user device is to activate a privacy mode (block 410). For example, user device 210 may receive input (e.g., from a user of user device 210 and/or from another device, such as server device 220) indicating that user device 210 should activate a privacy mode. In some implementations, a user may provide input to user device 210, and user device 210 may activate the privacy mode based on receiving the user input.

Additionally, or alternatively, a user may provide input to user device 210 that specifies a condition for activating and/or deactivating the privacy mode. In this case, user device 210 may determine whether the condition is met, and may activate or deactivate the privacy mode based on the condition being met. In some implementations, user device 210 may activate or deactivate the privacy mode based on multiple conditions being met.

The condition may be based on a quantity of human faces detected by user device 210, in some implementations. For example, user device 210 may detect, using a camera (e.g., a front-facing camera that faces approximately the same direction as the display of user device 210), a quantity of human faces in the vicinity of user device 210. If the quantity of detected faces satisfies a threshold (e.g., at least one, more than one, at least three, etc.), user device 210 may activate the privacy mode.

The condition may be based on an angle of the faces with respect to user device 210, in some implementations. For example, user device 210 may detect, using a camera, an angle of one or more faces, in the vicinity of user device 210, with respect to the display and/or the camera of user device 210. User device 210 may detect a quantity of faces within one or more angle ranges with respect to user device 210 (e.g., within 20 degrees left or right and/or within 30 degrees up or down with respect to a full frontal, centered face directly facing user device 210). If the quantity of faces within the angle ranges satisfies a threshold (e.g., at least one, more than two, etc.), user device 210 may activate the privacy mode. Additionally, or alternatively, user device 210 may use eye-tracking to determine a quantity of people looking in a direction of user device 210. If the quantity of people looking in the direction of user device 210 satisfies a threshold (e.g., more than one, at least three, etc.), user device 210 may activate the privacy mode.

The condition may be based on a volume level detected by user device 210, in some implementations. For example, user device 210 may use a microphone to determine a volume level of noise detected within the vicinity of user device 210. If the volume level satisfies a threshold (e.g., greater than sixty decibels), user device 210 may activate the privacy mode. Additionally, or alternatively, user device 210 may determine a frequency of the detected noise. If the frequency of the detected noise falls within a particular frequency range (e.g., between 85 hertz and 255 hertz, the frequency range of typical human voices), and/or the volume of noise within the particular frequency range satisfies a threshold, user device 210 may activate the privacy mode.

The condition may be based on a quantity of other devices detected by user device 210, in some implementations. For example, user device 210 may detect other devices in the vicinity of user device 210 (e.g., by detecting near-field communication, available and/or connected radio communications, such as a WiFi or BLUETOOTH connection, etc.), and may activate the privacy mode based on the detected quantity of other devices satisfying a threshold.

In some implementations, the condition may be based on time, such as a time of day (e.g., before or after a particular time, within a particular time range, etc.), a date (e.g., a month, day, and/or year; a holiday; a user's birthday; etc.), a day of the week (e.g., Monday, Tuesday, etc., a weekday, a weekend), a particular week or set of weeks, a particular month or set of months, a particular season (e.g., spring, summer, fall, winter), a particular year, etc.

In some implementations, the condition may be based on a speed or velocity at which user device 210 is moving, an acceleration of user device 210, a geographic location of user device 210 (e.g., determined based on a time zone, global positioning system (GPS) coordinates, cellular base station triangulation, etc.), a change in geographic location of user device 210 (e.g., a change of location in a particular time period, indicating that the user is traveling, such as at a particular speed), a landmark, attraction, merchant, etc. associated with a geographic location of user device 210 (e.g., a golf course, a national park, a restaurant, an airport, a coffee shop, etc.), a temperature detected by user device 210, an altitude detected by user device 210, etc.

In some implementations, the condition may be based on a network connectivity of user device 210, such as whether user device 210 is connected to a particular type of network, such as a radio access network (RAN), a local area network (LAN)/personal area network (PAN) (e.g., a BLUETOOTH network, a WiFi network, an ultra-wideband network, etc.), whether user device 210 is connected to a particular network, such as a network identifiable by particular access credentials, such as a username and password (e.g., a user's home network, a BLUETOOTH network in a user's car, a network at a particular merchant location, a network connection to another user device 210, etc.), etc. In some implementations, the condition may be based on whether user device 210 is connected to another user device via a phone call.

As further shown in FIG. 4, process 400 may include activating the privacy mode by obscuring information displayed by a display of the user device (block 420). For example, user device 210 may obscure information displayed by (or presented on) the display of user device 210 by concealing the information, warping the information, blurring the information, jumbling the information, blotting out the information, hiding the information (e.g., displaying a picture, a color, a pattern, an image, etc. in place of the information), blocking the information, encrypting the information, fading the information, replacing the information with other information, constantly or periodically scrolling or moving the information, darkening or dimming the display, or otherwise obscuring, hiding, and/or concealing the information. The information may include text, images, videos, animations, icons, applications, or any other information that may be displayed on user device 210.

In some implementations, obscuring the information may include adjusting a brightness (and/or dimness) level of the display, and user device 210 may activate the privacy mode by darkening the display (e.g., by reducing a brightness level of the display). User device 210 may activate the privacy mode directly based on user input and/or based on detecting a condition (e.g., a condition specified by a user).

As shown in FIG. 4, process 400 may include detecting a user interaction with the display (block 430). For example, user device 210 may detect that a user has touched or is touching a portion of a touch screen display of user device 210. The portion of the display may be less than the entirety of the display. Additionally, or alternatively, user device 210 may detect that a user has interacted with a portion of the display based on movement of a cursor associated with a user input device (e.g., a mouse, a pointer, etc.). In some implementations, detecting the user interaction may include authenticating the user, such as by fingerprint authentication, facial recognition, voice recognition, password authentication, etc., and user device 210 may deactivate the privacy mode based on the authentication. For example, user device 210 may detect that the user is touching the display, may authenticate the user's fingerprint, and may deactivate the privacy mode based on the detection and the authentication.

As further shown in FIG. 4, process 400 may include deactivating the privacy mode on a portion of the display associated with the user interaction (block 440). For example, user device 210 may deactivate the privacy mode on the portion of the display where the user interaction is detected. Additionally, or alternatively, user device may deactivate the privacy mode on another portion of the display, corresponding to the portion of the display where the user interaction is detected (e.g., above, below, to the left of, to the right of, etc. the portion where the interaction is detected). Deactivating the privacy mode may include revealing (e.g., displaying) information on the display of user device 210. For example, user device 210 may reveal the information obscured by the portion of the display, without revealing remaining information obscured by a remaining portion of the display (e.g., where the portion and the remaining portion make up the entirety of the display).

In some implementations, user device 210 may deactivate the privacy mode by lightening a portion of the display (e.g., by increasing a brightness level of the portion of the display). The lightened portion may include the portion where the user interaction is detected, may correspond to the portion where the user interaction is detected, may include a portion of the display surrounding the portion where the user interaction is detected, may include a portion of the display to the left of, to the right of, above, below, etc. the portion where the user interaction is detected, etc.

While a series of blocks has been described with regard to FIG. 4, the blocks and/or the order of the blocks may be modified in some implementations. Additionally, or alternatively, non-dependent blocks may be performed in parallel.

Figure 5:
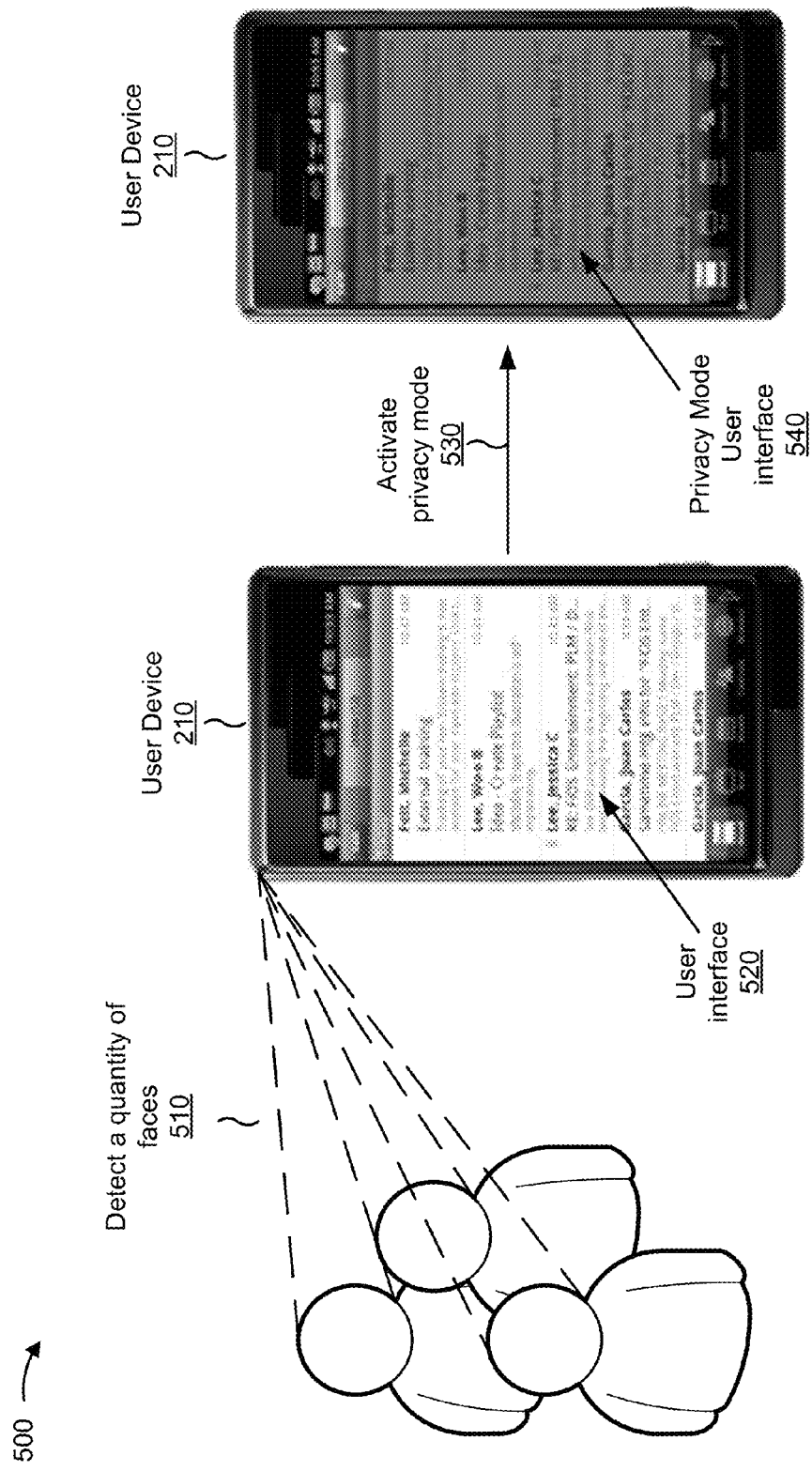
FIGS. 5-10 are diagrams of example implementations relating to the example process shown in FIG. 4.

FIG. 5 is a diagram of an example implementation 500 relating to process 400 shown in FIG. 4. In example implementation 500, user device 210 may activate a privacy mode by detecting a quantity of faces in the vicinity of user device 210.

As shown by reference number 510, user device 210 may detect a quantity of faces in the vicinity of user device 210. For example, user device 210 may detect faces that are in a viewing area of a camera (e.g., a front-facing camera) associated with user device 210 (e.g., a camera incorporated into user device 210). Additionally, or alternatively, user device 210 may detect an angle of the faces in relation to user device 210. For example, user device 210 may determine a quantity of faces that are within 30 degrees of directly facing user device 210 and/or the camera associated with user device 210. User device 210 may determine that the quantity of faces and/or the quantity of faces within a range of angles with respect to user device 210 satisfies a threshold.

Based on determining that the threshold is satisfied, user device 210 may activate a privacy mode that obscures information presented on user interface 520 of user device 210, as shown by reference number 530. For example, user device 210 may darken user interface 520, as shown by privacy mode user interface 540.

Figure 6:
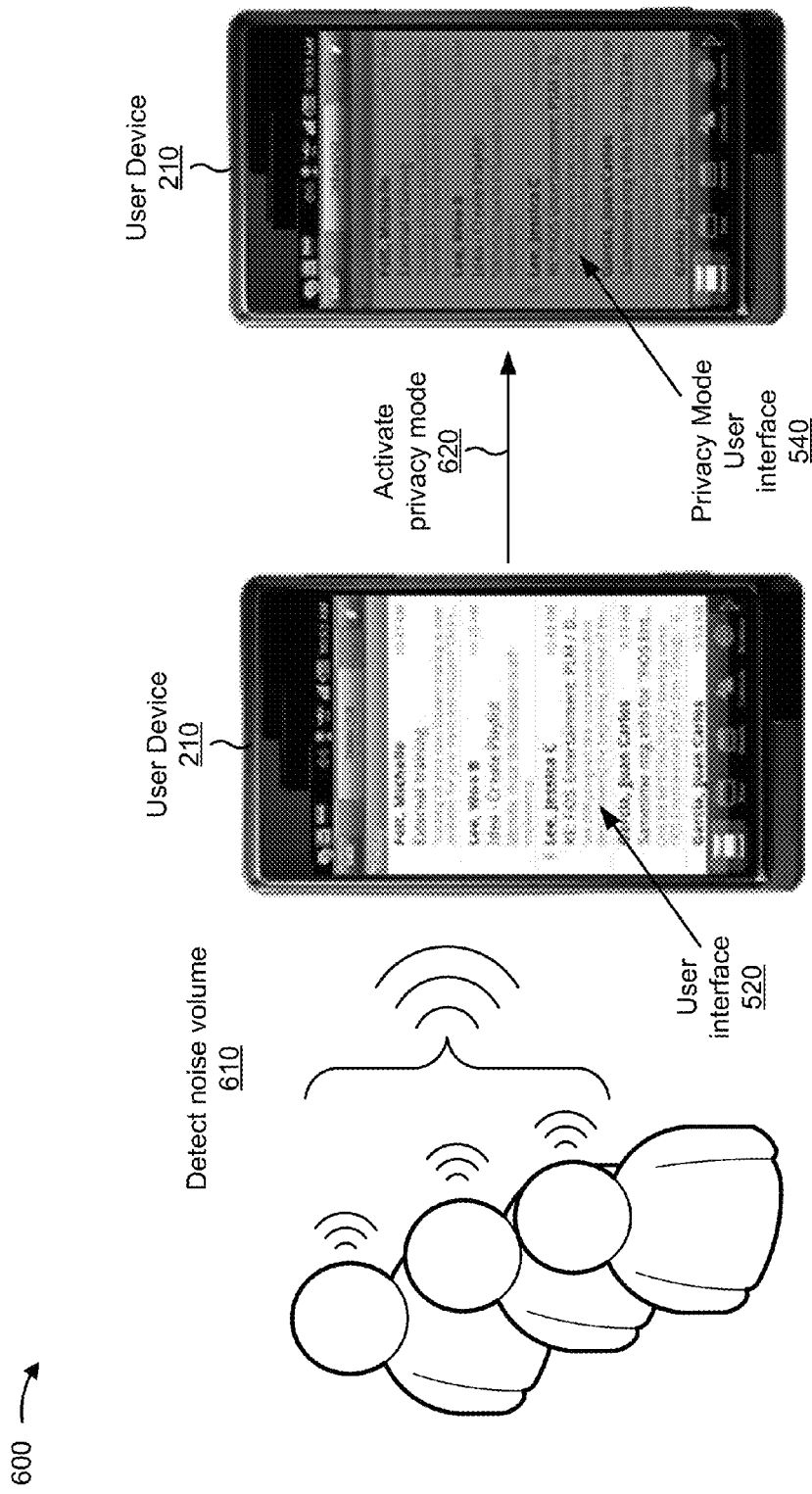

FIG. 6 is a diagram of an example implementation 600 relating to process 400 shown in FIG. 4. In example implementation 600, user device 210 may activate a privacy mode by detecting a volume of noise in the vicinity of user device 210.

As shown by reference number 610, user device 210 may detect a volume level of noise in the vicinity of user device 210. For example, user device 210 may detect the volume level using a microphone associated with user device 210 (e.g., a microphone incorporated into user device 210). User device 210 may determine that the volume level satisfies a threshold.

Based on determining that the threshold is satisfied, user device 210 may activate a privacy mode that obscures information presented on user interface 520 of user device 210, as shown by reference number 620. For example, user device 210 may darken user interface 520, as shown by privacy mode user interface 540.

Figure 7:
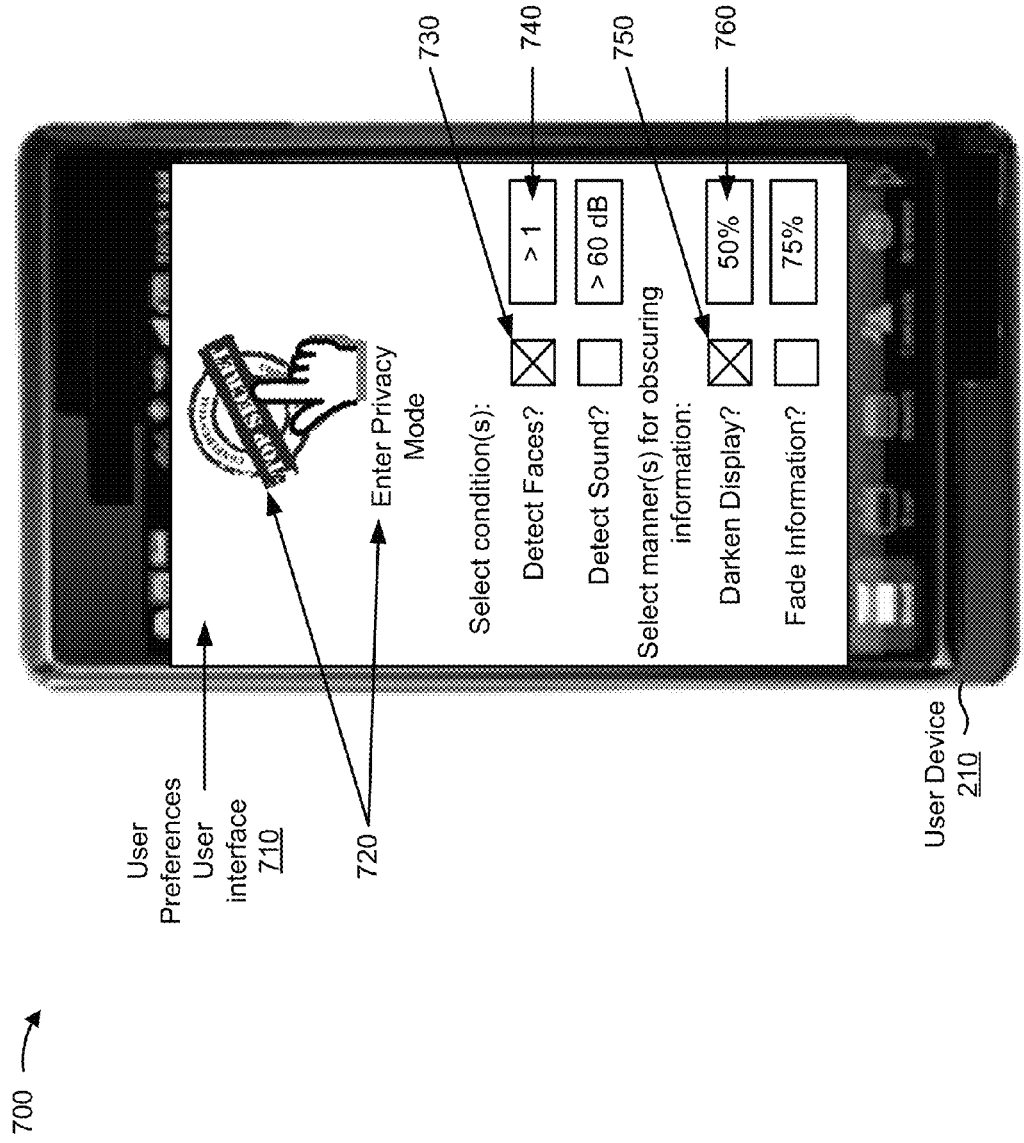

FIG. 7 is a diagram of an example implementation 700 relating to process 400 shown in FIG. 4. In example implementation 700, user device 210 may activate a privacy mode based on receiving input from a user of user device 210.

As shown in FIG. 7, a user may interact with user preferences user interface 710 to configure the implementation of the privacy mode on user device 210. For example, a user may interact with (e.g., by touching, clicking, swiping, etc.) an input element (e.g., a button, an icon, a link, an application shortcut, etc.) on user interface 710, as shown by reference number 720. User device 210 may activate the privacy mode based on the user interaction with the input element. Additionally, or alternatively, user device 210 may activate the privacy mode based on detecting a voice command.

Additionally, or alternatively, a user may interact with user interface 710 to input information that identifies a condition that, when satisfied, causes user device 210 to activate the privacy mode. For example, as shown by reference number 730, the user may provide input via an input element (e.g., a checkbox, as shown), that causes user device 210 to detect faces in the vicinity of user device 210, a noise level in the vicinity of user device, and/or another condition. Additionally, or alternatively, the user may provide information that identifies a threshold that, when satisfied by the condition, causes user device 210 to activate the privacy mode (e.g., a quantity of faces, a volume level of noise, etc.), as shown by reference number 740. User device 210 may activate the privacy mode based on satisfaction of a condition input by the user (e.g. the quantity of detected faces, the detected noise level, and/or another condition satisfying a threshold).

Additionally, or alternatively, a user may interact with user interface 710 to input information that identifies a manner in which user device 210 obscures information. For example, as shown by reference number 750, the user may provide input via an input element (e.g., a checkbox, as shown), that causes user device 210 to activate the privacy mode by darkening the display, fading information displayed by the display, and/or utilizing another technique to obscure information displayed by the display. Additionally, or alternatively, the user may input information that identifies a parameter associated with the manner for obscuring information, as shown by reference number 760. For example, the user may input information that specifies a brightness level of the display of user device 210 when the privacy mode is active (e.g., 50%), a degree to which information presented on the display is to be faded when the privacy mode is active (e.g., 75%), other information that specifies a degree to which information presented on the display is to be obscured, etc.

In some implementations, user preferences (e.g., input via user preferences user interface 710) may be stored on server device 220 to facilitate the use of the same user preferences across multiple user devices 210 associated with the user. For example, a user may download, to user device 210, user preferences stored on server device 220. Additionally, or alternatively, user preferences may be transferred between user devices 210 (e.g., using a near-field communication link, a BLUETOOTH connection, etc.).

Figure 8:
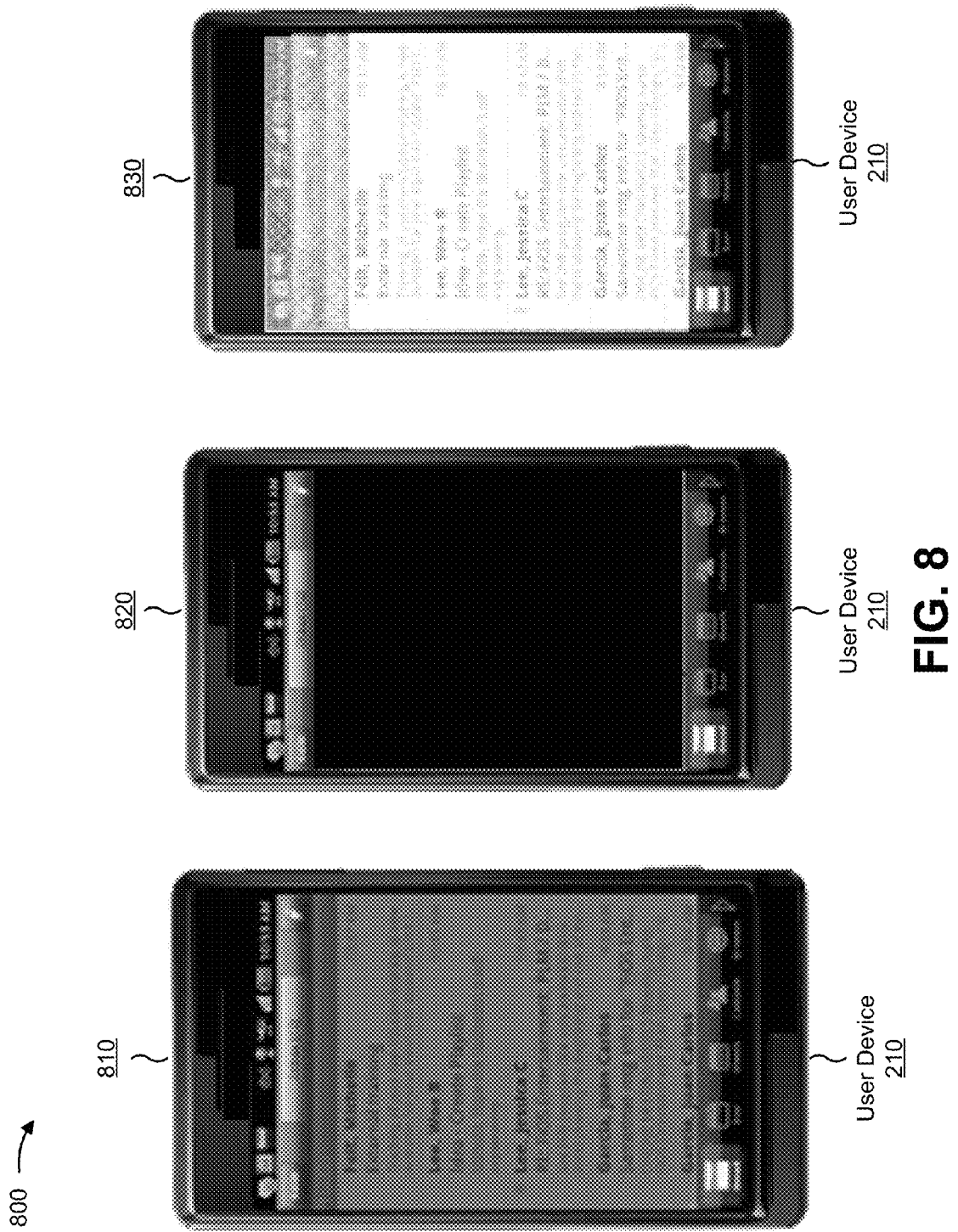

FIG. 8 is a diagram of an example implementation 800 relating to process 400 shown in FIG. 4. In example implementation 800, user device 210 may display privacy mode user interface 540 using different manners or techniques for obscuring information.

As discussed in connection with FIG. 7, a user of user device 210 may specify a brightness level of a display of user device 210 and/or a user interface displayed on user device 210 (e.g., privacy mode user interface 540) when user device 210 is in privacy mode. For example, the user may select a brightness level between and including full brightness (e.g., 0% dimming/darkening in privacy mode) and full darkness (e.g., 100% dimming/darkening in privacy mode). Reference number 810 shows an implementation where user device 210 partially dims the display in privacy mode (e.g., by 50%). Reference number 820 shows an implementation where user device 210 completely dims the display in privacy mode (e.g., by 100%).

Additionally, or alternatively, the user may input information that specifies a degree to which information presented on the display is to be obscured. Reference number 830 shows an implementation where user device 210 fades the information displayed by the display in privacy mode (e.g., by 75%).

Figure 9:
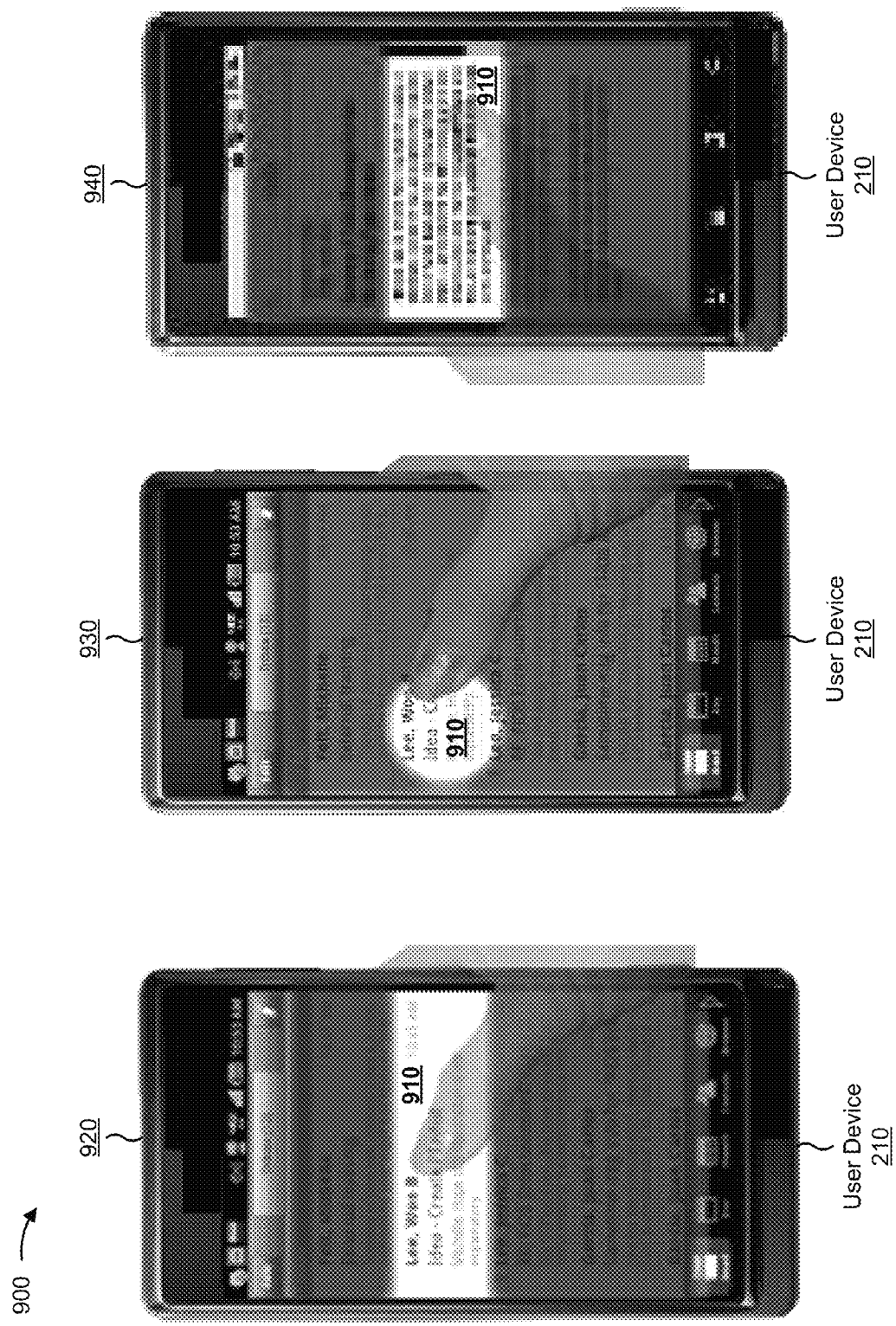

FIG. 9 is a diagram of an example implementation 900 relating to process 400 shown in FIG. 4. In example implementation 900, user device 210 may deactivate the privacy mode on a portion 910 of the display based on a user interaction with user device 210.

As shown by reference number 920, user device 210 may deactivate the privacy mode on a horizontal portion 910 of the display. The horizontal portion 910 may be centered around the portion of the display where the user interaction is detected, and/or an area to the left, to the right, above, below, etc. the portion of the display where the user interaction is detected (e.g., based on user input via privacy preferences user interface 710). Deactivating the privacy mode on a portion 910 of the display may include brightening the portion 910 (e.g., increasing a brightness level and/or decreasing a dimness level). For example, the portion 910 may be brightened to a default brightness level (e.g., a brightness level of the display when not in privacy mode), or may be brightened to a brightness level between that of the brightness level in privacy mode and the default brightness level (e.g., based on user input via privacy preferences user interface 710).

As shown by reference number 930, user device 210 may deactivate the privacy mode on a circular portion 910 of the display. The circular portion 910 may be centered around the portion of the display where the user interaction is detected, and/or an area to the left, to the right, above, below, etc. the portion of the display where the user interaction is detected (e.g., based on user input via privacy preferences user interface 710). While shown as a circle, portion 910 may take any shape, such as a square, an oval, an octagon, a pentagon, a row, a column, etc.

As shown by reference number 940, user device 210 may deactivate the privacy mode on a textual portion 910 of the display. The textual portion 910 may include a paragraph of text, a line of text, etc., and may be based on a portion 910 of text obscured by the portion of the display where the user interaction is detected.

Additionally, or alternatively, a user may input user preferences associated with unobscured portion 910, and user device 210 may deactivate the privacy mode on portion 910 based on the user preferences. For example, a user may input a shape of portion 910 (e.g., a circle, an oval, a square, a rectangle, etc.), a size of portion 910 (e.g., a width, a height, a radius, an area, etc.), a location of portion 910 with respect to the portion of the display where the interaction is detected (e.g., above, below, to the left, to the right, centered, etc.), etc. In some implementations, a user may interact with the display (e.g., by tapping, double-tapping, clicking, double-clicking, etc.) to change a user preference. For example, a user may double-tap the display to change a shape and/or a size of portion 910.

In some implementations, user preferences may be stored on server device 220 to facilitate the use of the same user preferences across multiple user devices 210 associated with the user. For example, a user may download, to user device 210, user preferences stored on server device 220. Additionally, or alternatively, user preferences may be transferred between user devices 210 (e.g., using a near-field communication link, a BLUETOOTH connection, etc.).

Figure 10:
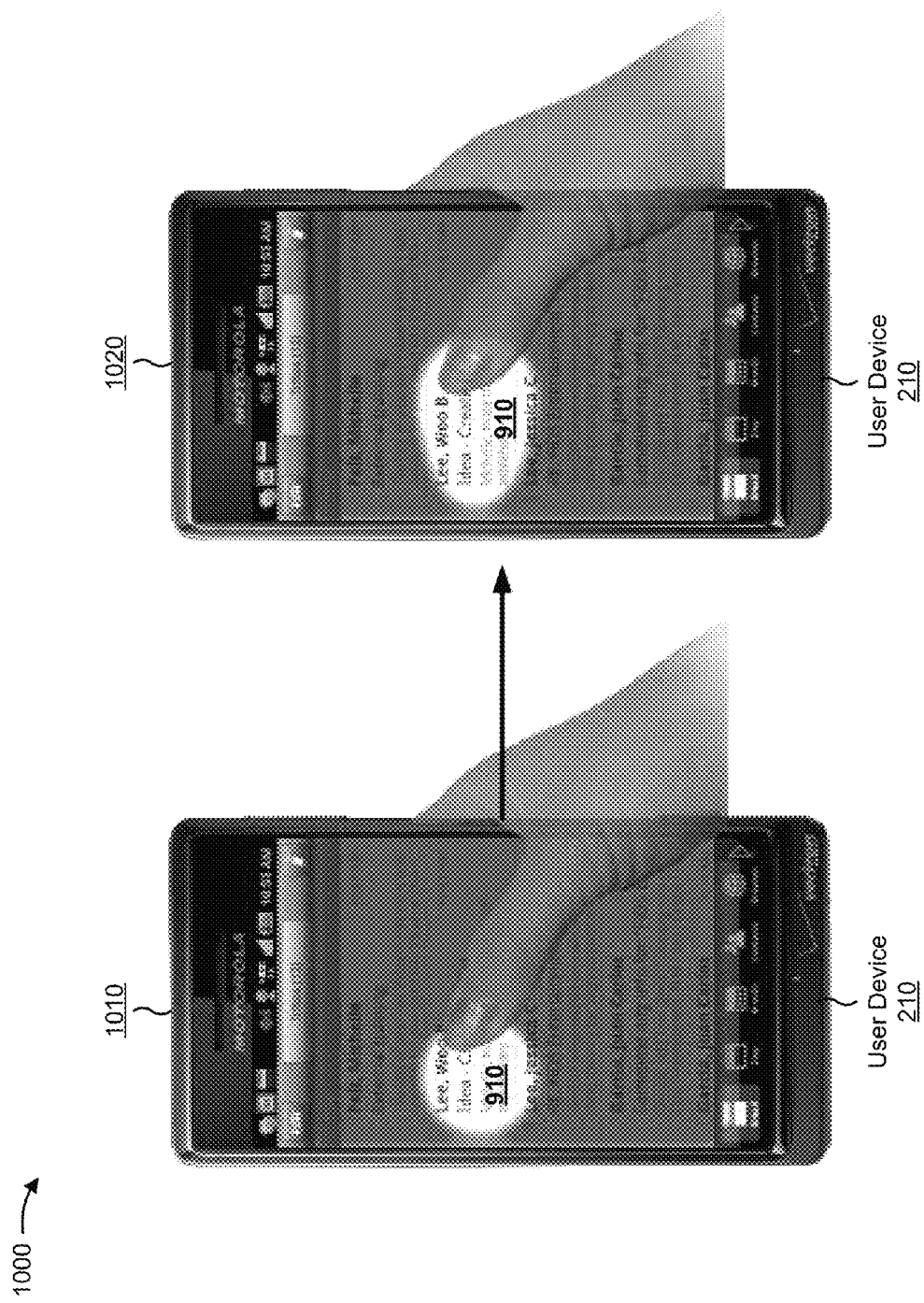

FIG. 10 is a diagram of an example implementation 1000 relating to process 400 shown in FIG. 4. In example implementation 1000, user device 210 may deactivate the privacy mode on a portion 910 of the display based on a user interaction with user device 210.

As shown by reference numbers 1010 and 1020, a user may interact with different portions of the display of user device 210, and user device 210 may detect the user interaction with different portions of the display. As the portion of the display where the user interaction is detected changes, portion 910 where privacy mode is deactivated may change. For example, as a user slides her thumb from left to right on the display, the unobscured portion 910 of the display may move from left to right. In some implementations, a first unobscured portion 910 where the privacy mode is deactivated, based on user interaction with a first portion of the display, may remain unobscured when the user interacts with a second portion of the screen (different from the first portion) that causes user device 210 to deactivate the privacy mode on a second portion 910. Alternatively, user device 210 may activate the privacy mode on the first portion 910 (e.g., by obscuring information displayed by first portion 910) when the user interacts with the second portion of the screen that causes user device 210 to deactivate the privacy mode on the second portion 910. In some implementations, the activation and/or deactivation may be delayed, and may occur a particular time after the user interaction and/or the change in user interaction is detected (e.g., 3 seconds).

Additionally, or alternatively, the unobscured portion 910 may move automatically. For example, the user may interact with a portion of the display, which may cause user device 210 to deactivate the privacy mode on portion 910 of the display. The unobscured portion 910 may move on the user interface of the display, for example, at a particular speed. For example, the unobscured portion 910 may move from left to right, from top to bottom, from left to right across a first horizontal portion of the screen and then from left to right across a second horizontal portion of the screen (e.g., a portion below the first horizontal portion), etc. Additionally, or alternatively, user device 210 may track eye movement of the user, and may deactivate the privacy mode from portion 910 based on detecting a portion of the display at which the user is looking.

In some implementations, a user may input user preferences associated with portion 910, and user device 210 may deactivate the privacy mode on portion 910 based on the preferences. For example, a user may input an amount of time for portion 910 to return to privacy mode (e.g., obscure information) when the user interaction changes to a different portion of the display, a speed with which portion 910 moves (e.g., automatically or based on a user interaction such as a swipe), a direction with which portion 910 moves (e.g., automatically), etc. In some implementations, a user may interact with the display (e.g., by tapping, double-tapping, clicking, double-clicking, etc.) to change a preference. For example, portion 910 may move automatically across the display, and the user may double-tap the display to start and/or stop the movement of portion 910.

In some implementations, user preferences may be stored on server device 220 to facilitate the use of the same user preferences across multiple user devices 210 associated with the user. For example, a user may download, to user device 210, user preferences stored on server device 220. Additionally, or alternatively, user preferences may be transferred between user devices 210 (e.g., using a near-field communication link, a BLUETOOTH connection, etc.).

Implementations described herein may assist a user in viewing information displayed on a user device, while preventing people in the user's vicinity from viewing the information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein. In some implementations, the user interfaces may be customizable by a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors, implemented at least partially in hardware, to:
   determine that a volume level of noise, within a particular frequency range, is greater than a threshold volume of noise;
   determine whether the device is connected to a particular network;
   determine that the device is to activate a privacy mode based on the volume level of noise being greater than the threshold volume of noise and based on whether the device is connected to the particular network;
   obscure, based on determining that the device is to activate the privacy mode, information displayed by a display of the device;
   detect a first user interaction with a first portion of the display,
      the first portion being less than an entirety of the display;
   reveal, based on detecting the first user interaction with the first portion of the display, first information obscured by the first portion of the display, without revealing information obscured by a remaining portion of the display,
      the first portion and the remaining portion comprising the entirety of the display;
   detect a second user interaction with a second portion of the display;
   reveal, based on detecting the second user interaction with the second portion of the display, second information obscured by the second portion of the display; and
   delay obscuring the first information for a particular amount of time after detecting the second user interaction with the second portion of the display.

2. The device of claim 1, where the one or more processors, when determining that the device is to activate the privacy mode, are further to:
   detect a quantity of faces within a vicinity of the device; and
   determine that the device is to activate the privacy mode based on the quantity of faces satisfying a threshold.

3. The device of claim 2, where the quantity of faces includes a quantity of faces that are angled within a particular range of angles with respect to the device.

4. The device of claim 1, where the one or more processors, when determining that the volume level of noise is greater than the threshold volume of noise, are further to:
   determine that the volume level of noise, within a range between about 85 hertz and about 255 hertz, is greater than the threshold volume of noise.

5. The device of claim 1, where the one or more processors, when determining that the device is to activate the privacy mode, are further to:
   detect a quantity of other devices within a vicinity of the device; and
   determine that the device is to activate the privacy mode based on the quantity of other devices satisfying a threshold.

6. The device of claim 1, where the one or more processors, when detecting the user interaction with the first portion of the display, are further to:
   detect that a user has touched or is touching the first portion of the display.

7. The device of claim 1, where the one or more processors, when obscuring information displayed by the display of the device, are further to:
   decrease a brightness level of the display; and
   where the one or more processors, when revealing the first information obscured by the first portion of the display, are further to:
      increase a brightness level of the first portion of the display.

8. The device of claim 1, where the one or more processors, when obscuring the information displayed by the display of the device, are further to at least one of:
   replace the information with other information;
   blur the information;
   jumble the information;
   fade the information; or
   scroll or move the information.

9. A non-transitory computer-readable medium storing instructions, the instructions comprising:
   one or more instructions that, when executed by a processor of a device, cause the processor to:
   determine that a volume level of noise, within a particular frequency range, is greater than a threshold volume of noise;
   determine whether the device is connected to a particular network;
   determine that the device is to activate a privacy mode based on the volume level of noise being greater than the threshold volume of noise and based on whether the device is connected to the particular network;
   obscure, based on determining that the device is to activate the privacy mode, information displayed by a display of the device;
   detect a first user interaction with a first portion of the display;
   reveal, based on detecting the first user interaction with the first portion of the display, first information obscured by a first corresponding portion of the display,
      the first corresponding portion corresponding to the first portion of the display,
      the first corresponding portion being revealed without revealing information obscured by a remaining portion of the display, and
      the first corresponding portion and the remaining portion comprising an entirety of the display;
   detect a second user interaction with a second portion of the display;
   reveal, based on detecting the second user interaction with the second portion of the display, second information obscured by a corresponding second portion of the display,
      the corresponding second portion corresponding to the second portion of the display; and
   obscure the first information based on the second interaction,
      the first information being obscured after a particular amount of time has elapsed.

10. The non-transitory computer-readable medium of claim 9, where the one or more instructions, that cause the processor to determine that the device is to activate the privacy mode, further cause the processor to:
    detect a quantity of faces within a vicinity of the device; and
    determine that the device is to activate the privacy mode based on the quantity of faces satisfying a threshold.

11. The non-transitory computer-readable medium of claim 9, where the one or more instructions, that cause the processor to determine that the volume level of noise is greater than the threshold volume of noise, further cause the processor to:
   determine that the volume level of noise, within a range between about 85 hertz and about 255 hertz, is greater than the threshold volume level of noise.

12. The non-transitory computer-readable medium of claim 9, where the one or more instructions, that cause the processor to determine that the device is to activate the privacy mode, further cause the processor to:
   detect a quantity of other devices within a vicinity of the device; and
   determine that the device is to activate the privacy mode based on the quantity of other devices satisfying a threshold.

13. The non-transitory computer-readable medium of claim 9, where the one or more instructions, that cause the processor to detect the first user interaction with the first portion of the display, further cause the processor to:
   detect that a user has touched or is touching the first portion of the display.

14. A method, comprising:
   determining, by a device, that a volume level of noise, within a particular frequency range, is greater than a threshold volume of noise;
   determining, by the device, whether the device is connected to a particular network;
   determining, by the device, that the device is to activate a privacy mode based on the volume level of noise being greater than the threshold volume of noise and based on whether the device is connected to the particular network;
   obscuring, by the device and based on determining that the device is to activate the privacy mode, information displayed by a display of the device;
   detecting, by the device, a first user interaction with a first portion of the display,
      the first portion being less than an entirety of the display;
   revealing, by the device and based on detecting the first user interaction, first information obscured by the first portion of the display;
   detecting, by the device, a second user interaction with a second portion of the display,
      the second portion being less than the entirety of the display and being different from the first portion;
   revealing, by the device and based on detecting the second user interaction, second information obscured by the second portion of the display; and
   obscuring, by the device and based on detecting the second user interaction, the first information,
      the obscuring the first information being delayed a particular amount of time after detecting the second user interaction.

15. The method of claim 14, further comprising:
   detecting a quantity of faces within a vicinity of the device; and
   determining that the device is to activate the privacy mode based on the quantity of faces satisfying a threshold.

16. The method of claim 15, where the quantity of faces includes a quantity of faces that are angled within a particular range of angles with respect to the device.

17. The method of claim 14, where detecting the first user interaction with the first portion of the display includes:
   detecting that a user has touched or is touching the first portion of the display, and
   where detecting the second user interaction with the second portion of the display includes:
      detecting that a user has touched or is touching the second portion of the display.

18. The method of claim 14, where obscuring the information displayed by the display of the device further comprises at least one of:
   decreasing a brightness level of the display;
   replacing the information with other information;
   blurring the information;
   jumbling the information;
   fading the information; or
   scrolling or moving the information.

19. The device of claim 1, where the second portion of information corresponds to a portion of the information displayed on the display that is within an area centered around a location associated with the second user interaction, and
   where the one or more processors are further to:
      detect another user interaction with the display; and
      increase a size of the area centered around the location associated with the second user interaction based on detecting the other user interaction,
         increasing the size of the area causing additional information to be revealed.

20. The computer-readable medium of claim 9, where the second information corresponds to a portion of the information displayed on the display that is within an area defined by a particular shape,
   where the particular shape is centered around a location, on the display, associated with the second user interaction, and
   where the instructions further comprise:
      one or more instructions that, when executed by the processor, cause the processor to:
         detect another user interaction with the display,
            where the other user interaction comprises a different type of user interaction than the first user interaction and the second user interaction; and
         modify, based on detecting the other user interaction, a characteristic of the particular shape.

* * * * *